Patented Sept. 27, 1949

2,482,816

UNITED STATES PATENT OFFICE 2,482,816

METHOD OF WATERPROOFING TEXTILES WITH ZIRCONYL COMPOUNDS

Henry L. Van Mater, Highland Park, N. J., assignor, by mesne assignments, to National Lead Company, New York, N. Y., a corporation of New Jersey No Drawing. Application June 8, 1943, Serial No. 490,079

8 Claims. (Cl. 117—167)

This invention relates to the employment of certain salts of zirconium, as water repellent or waterproofing agents for textiles and to methods for treating textiles with such salts.

Heretofore it has been proposed to employ water insoluble soaps as water repellents for textiles. The term water repellent is, however, a purely relative term and the materials presently employed to render textiles water resistant leave much room for improvement.

It is an object of the present invention to provide a composition and method for rendering textile goods water resistant.

In accordance with the present invention zirconium salts are deposited upon and employed to impregnate textile goods to render the same water resistant. To this end, certain zirconium compounds which either hydrolyze at elevated temperatures or under controlled conditions of acidity are used and particularly zirconium compounds of the water soluble fatty acids.

The following is presented as one explanation of the reactions involved. Other explanations may be possible.

Proof may be found in the literature that certain hydrated compounds of zirconium sulfate which were formerly assigned a formula such as $Zr(SO_4)_2XH_2O$ should in reality have the formula $ZrOSO_4.H_2SO_4.(X-1)H_2O$. This ability of zirconyl compounds to form co-ordination compounds, in the above case, with a molecule of free sulfuric acid, is further supplemented by its ability to form double salts such as $$ZrOSO_4.Na_2SO_4.XH_2O$$

etc.

Many references in the literature may be found which refer to basic zirconyl compounds but few attempts to postulate a formula for such compounds have been made.

My investigations give evidence that aqueous solutions of certain salts of zirconium produce compounds in which the zirconium atom exists in a basic zirconyl radical of the formula $ZrOOH^{+1}$.

*Example 1.*—If one mole of a soluble zirconyl salt, for example $ZrOCl_2.7H_2O$, is allowed to react with two moles of a soluble stearate, for example $C_{17}H_{35}COONa$, there is formed a water insoluble compound, the analysis of which corresponds to $ZrO(C_{17}H_{35}COO)_2.H_2O$.

This compound is completely soluble in certain organic solvents such as benzene, toluene, etc., from which it may be recovered by evaporation of the solvent or by cooling a hot saturated solution. However, if this compound is treated with anhydrous methanol or ethanol, free stearic acid is extracted from it in an amount corresponding to one mole of the free acid for each mole of the original compound. The remaining alcohol insoluble residue by analysis corresponds to the formula $ZrO(OH)C_{17}H_{35}COO$.

This would indicate that the formula of the original compound should have been $$ZrO(OH)C_{17}H_{35}COO.C_{17}H_{35}COOH$$

The alcohol insoluble residue corresponds exactly with the compound formed if one mole of zirconyl chloride is reacted with one mole of sodium stearate.

*Example 2.*—If to one mole of precipitated zirconyl carbonate there is added one mole of acetic acid, the solution of the zirconyl carbonate is quite incomplete. If, however, two moles or more of acetic acid is added the solution is complete. Careful evaporation of this solution containing two or more moles of acetic acid yields an acetate corresponding to the formula $$ZrO(CH_3COO)_2.H_2O$$

This compound is water soluble and perfectly stable in air at room temperature. If gently heated or placed in a vacuum, acetic acid is given off in an amount corresponding to one mole per mole of the original compound. The residue is water insoluble and its analysis corresponds to $ZrO(OH)(CH_3COO)$.

A three per cent solution of the basic zirconyl acetate-acetic acid compound $$ZrO(OH)(CH_3COO).CH_3COOH$$

shows no hydrolysis on standing at room temperature for several weeks. A one percent solution of this salt shows evidence of hydrolysis on standing for ten to twelve hours.

Freshly prepared solutions of this salt show no evidence of hydrolysis up to 40° C. At 50° C. hydrolysis takes place rapidly as indicated by the formation of an insoluble compound. Analysis of this insoluble compound indicates that it also has the formula $ZrO(OH)(CH_3COO)$.

Another method of producing the same insoluble compound is to raise the pH of the solution by the addition of an alkaline salt, which does not form an insoluble compound with zirconium, to approximately pH 6. The zirconium is then precipitated as the basic zirconyl acetate, $ZrO(OH)(CH_3COO)$ and has the same properties as that produced by heating.

Apparently at temperatures above 50° C. or by the elevation of the pH of the solution the co-ordination linkage between the basic zirconyl acetate and the acetic acid is broken and the acetic acid is replaced by water molecules.

In this hydrated state the compound appears to hold two molecules of water—

$$ZrO(OH)(CH_3COO).2H_2O$$

The loss in weight in air dried samples when dried at 105° C. corresponds to this amount.

While in this hydrated state this basic zirconyl acetate still shows strong ability to form co-ordination compounds. Metallic salts which are acid in character and organic compounds which contain an acid group, particularly the sulfonic acid group, will add themselves to the basic zirconyl acetate.

Apparently an equilibrium is set up between the tendency of the water molecules to hydrate the basic zirconyl acetate and the tendency of the acid compounds to co-ordinate with it. Such co-ordination reactions are never complete and the attached molecules of acid character may be removed by repeated washing.

However, if the co-ordination compounds formed by the basic zirconyl acetate and the acidic type of molecules are filtered off and dehydrated completely then the attached acid type of molecule can no longer be removed by washing.

Apparently sufficient shrinkage of the crystal lattice occurs in the dehydration so that the molecule will no longer become hydrated and the equilibrium condition re-established.

Like the zirconyl sulfate, referred to above, the hydrogen of the acetic acid molecule in the compound $ZrO(OH)(CH_3COO).CH_3COOH$ may be replaced by a metallic ion. Under proper conditions the double salt $$ZrO(OH)(CH_3COO).CH_3COONa.XH_2O$$

may be formed.

Phenomena parallel to those observed with the reactions between zirconium carbonate and acetic acid and the formation and hydrolysis of the resulting salt, may likewise be observed with zirconium carbonate and formic acid or other organic acids.

The terms "zirconyl coordination salt" or "zirconyl coordination compound" refer to molecular associations of a free acid and a normal zirconyl salt. The reactions and constitution of these molecular complexes appear to conform with the coordination theory of Werner (see "A Comprehensive Treatise on Inorganic and Theoretical Chemistry," by J. W. Mellor, vol. VIII, Longmans Green and Co., 1928, pages 228-242).

One of the outstanding characteristic properties of the basic zirconyl ($ZrOOH^+$) compounds of acetic, formic and certain other organic acids together with the co-ordination compounds with aids or compounds of acid nature derived therefrom are their hydrophobic or water repellent nature.

Therefore, the purpose of this invention is to describe the method of preparing and applying such hydrophobic zirconium compounds to textile materials in such a way as to render the treated materials water repellent.

*Example I.*—The textile sample of cotton, rayon, wool, silk or other material of vegetable or animal origin is treated by saturating the sample with a dilute, for example, a one per cent solution of the acetic acid co-ordination compound of basic zirconyl acetate $$ZrO(OH)(CH_3COO).CH_3COOH$$

which may also be referred to as zirconyl acetate monohydrate $ZrO(CH_3COO)_2.H_2O$ for a period of thirty seconds at any convenient temperature up to approximately 40° C. The textile material is then removed from the bath and the excess solution removed by wringing or centrifuging. The textile sample is then placed in a steam chest or other enclosure in which steam can be applied and the textile material is steamed for several minutes or for a sufficient time to insure all of the material reaching a temperature of 80° C. and to cause complete hydrolysis of the above mentioned zirconium compound. The textile material may then be dried at 100 to 105° C. If desired, the material may be washed in warm water prior to final drying.

The treatment with the zirconium solution and subsequent steaming may be repeated prior to final drying.

*Example II.*—The textile sample of cotton, rayon, wool, silk or other material of vegetable or animal origin, is treated in a dilute, for example a one per cent, solution of the acetic acid co-ordination compound of basic zirconyl acetate, mentioned in Example No. 1. The excess solution is removed and the textile sample is then introduced into a dilute solution of borax or other alkaline salt containing a negative ion which does not form an insoluble compound with zirconium. The alkalinity of the borax or other solution raises the pH of the solution and causes precipitation of the basic zirconyl acetate $$ZrO(OH)(CH_3COO)$$

within and on the surface of the fibres of the sample. The sample is then washed with warm water and dried at 100 to 105° C.

*Example III.*—The textile sample of cotton, rayon, wool, silk or other material of vegetable or animal origin is treated in a dilute, for example a one percent, solution of the sodium acetate co-ordination compound of basic zirconyl acetate at any convenient temperature up to 40° C. for approximately thirty seconds. The sample is then steamed, washed and dried as described above.

*Example IV.*—The textile sample is first treated in a dilute, for example a one per cent, solution of the sodium acetate co-ordination compound of basic zirconyl acetate at any convenient temperature up to 40° C. for approximately thirty seconds. The sample is then treated in a bath containing a dilute solution of borax or other basic salt mentioned above. The procedure thereafter is the same as in Example II.

*Example V.*—The textile sample is first treated with a dilute, for example a one per cent, solution of the formic acid co-ordination compound of basic zirconyl formate $$ZrO(OH)(COOH).HCOOH$$

The procedure thereafter is the same as described in Example I.

*Example VI.*—The textile sample is treated with a dilute, for example a one per cent, solution of the formic acid co-ordination compound of basic zirconyl formate at any convenient temperature up to 40° C. The sample is then treated in a dilute solution of borax or other alkaline salt mentioned above. The procedure thereafter is the same as in Example II.

*Example VII.*—The textile sample consisting of cellulose, regenerated cellulose, rayon or other cellulosic material is treated with a solution of the acetic acid co-ordination compound of basic zirconyl acetate, ZrO(OH)CH₃COO.CH₃COOH, of convenient concentration, for example a solution containing from four to seven per cent of the salt. The treatment is carried out preferably at 40° C. or below for approximately thirty seconds. Excess solution is removed from the sample and the sample is then dried in moderately warm air.

Varying conditions of drying may be used, depending upon the temperature of the air and its rate of flow over the sample. The drying should not be carried out too rapidly since time is required to allow the acetic acid portion of the molecule to react with the cellulose.

Regenerated cellulose is particularly adaptable to treatment by this method.

*Example VIII.*—The textile sample of cellulosic material is treated with a solution of the formic acid co-ordination compound of basic zirconyl formate of convenient concentration at 40° C. or below for approximately thirty seconds. The subsequent procedure is the same as in Example VII.

*Example IX.*—If sulfanilic acid is added to a solution containing a basic zirconyl salt of a water soluble fatty acid, for example the acetic acid co-ordination compound of basic zirconyl acetate referred to above, so that the ratio of sulfanilic acid and the basic zirconyl compound are mole for mole, the resulting stable solution may be used for the impregnation of textile fabrics to obtain water repellence.

The textile sample is immersed in such a solution having a content of, for example, 3.5% ZrO₂. The excess solution is removed by wringing or centrifuging and the sample is dried at 100° to 105° C. Excellent water repellent properties are obtained.

*Example X.*—Basic zirconyl stearate

ZrOOHC₁₇H₃₅COO also known as zirconium mono stearate, is soluble in certain organic solvents and forms colloidal suspensions with others.

This compound may be dissolved or suspended as a colloid in the solutions used for dry cleaning purposes. The addition of from one to two per cent of this compound to the last rinsing solution used in dry cleaning operations not only renders the textile material water repellent, but also considerably increases its resistance to creasing.

Textile goods treated by the above methods gave excellent results when tested for water repellence, either by the hydrostatic or spray methods. Further, certain heavy cotton fabrics exhibited excellent weather resistance over a period of several months as well as under standard accelerative tests. Cotton duck, for instance, when treated in accordance with the procedure of Example I showed resistance to a hydrostatic head of 18 inches which was reduced by 3 to 4 inches after washing for 15 minutes with ½ percent of soap as against a reduction of 50 per cent in instances where the material is treated in conventional manner.

What is claimed is:

1. The step in the method of rendering textile goods water repellent which comprises treating the goods with a solution of a water soluble zirconyl coordination salt of a water soluble fatty acid.

2. The step in the method of rendering textile goods water repellent which comprises impregnating the goods with a solution of a water soluble zirconyl coordination salt of a water soluble fatty acid.

3. The method of rendering textile goods water repellent which comprises wetting the goods with a solution containing a water soluble zirconyl coordination salt of an aliphatic acid at a temperature below the decomposition temperature of said compound and thereafter heating the so wetted goods to a temperature above its decomposition temperature whereby said compound is changed to a water insoluble condition.

4. The method of rendering textile goods water repellent which comprises wetting the goods with a solution containing a water soluble zirconyl coordination salt of an aliphatic acid at a temperature below about 40° C. and thereafter heating the so wetted goods to a temperature above about 40° C. until said compound has changed to a water insoluble condition.

5. The method of rendering textile goods water repellent which comprises wetting the goods with a solution of a zirconyl coordination salt of a water soluble fatty acid and then heating the so wetted goods to a temperature above the decomposition temperature of said salt whereby said salt is changed to a water insoluble condition.

6. The method of rendering textile goods water repellent which comprises wetting the goods with a solution of a zirconyl coordination salt of a water soluble fatty acid and an organic acid and thereafter drying the goods at a temperature above 40° C.

7. The method of rendering textile goods water repellent which comprises wetting the goods with a solution of a zirconyl coordination salt of a water soluble fatty acid and an organic acid and thereafter drying the goods in the neighborhood of 100° C.

8. The method of rendering textile goods water repellent which comprises wetting the goods with a mole for mole solution of the acetic acid co-ordination compound of basic zirconyl acetate and sulfanilic acid and thereafter drying the goods in the neighborhood of 100° C.

HENRY L. VAN MATER.

REFERENCES CITED

The following references are of record in the file of this patent:

UNITED STATES PATENTS

| Number | Name | Date |
| --- | --- | --- |
| 1,536,254 | White | May 5, 1925 |
| 1,717,483 | White | June 18, 1929 |
| 1,739,840 | Kendall | Dec. 17, 1929 |
| 1,896,381 | Weber et al. | Feb. 7, 1933 |
| 1,898,105 | Weber et al. | Feb. 21, 1933 |
| 1,925,914 | Tanker | Sept. 5, 1933 |
| 2,221,975 | Kinzie et al. | Nov. 19, 1940 |
| 2,316,057 | Doser et al. | Apr. 6, 1943 |
| 2,316,141 | Wainer | Apr. 6, 1943 |
| 2,328,431 | Doser et al. | Aug. 31, 1943 |
| 2,345,142 | Muller | Mar. 28, 1944 |

FOREIGN PATENTS

| Number | Country | Date |
| --- | --- | --- |
| 4,457 | Great Britain | Mar. 16, 1916 |